United States Patent
Plow et al.

(10) Patent No.: US 7,933,802 B2
(45) Date of Patent: Apr. 26, 2011

(54) SYSTEM, METHOD, AND COMPUTER PROGRAM PRODUCT FOR STORING INTERNET ADVERTISEMENTS AT A USER COMPUTER

(75) Inventors: Gregory Maurice Plow, Gilroy, CA (US); Farrokh E. Pourmirzaie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 09/922,182

(22) Filed: Aug. 2, 2001

(65) Prior Publication Data

US 2003/0028450 A1     Feb. 6, 2003

(51) Int. Cl.
*G06Q 30/00*     (2006.01)

(52) U.S. Cl. .................. 705/14.73; 705/14.4

(58) Field of Classification Search .......... 705/26, 705/27, 14, 14.4, 14.73
See application file for complete search history.

(56) References Cited

U.S. PATENT DOCUMENTS

| | | | | |
|---|---|---|---|---|
| 5,721,827 A | * | 2/1998 | Logan et al. | 709/217 |
| 5,724,521 A | * | 3/1998 | Dedrick | 705/26 |
| 5,740,549 A | | 4/1998 | Reilly et al. | 705/14 |
| 5,796,952 A | | 8/1998 | Davis et al. | 395/200.54 |
| 5,801,747 A | | 9/1998 | Bedard | 348/1 |
| 5,848,397 A | | 12/1998 | Marsh et al. | 705/14 |
| 5,909,492 A | * | 6/1999 | Payne et al. | 705/78 |
| 5,918,014 A | | 6/1999 | Robinson | 395/200.49 |
| 5,974,398 A | | 10/1999 | Hanson et al. | 705/14 |
| 5,974,451 A | | 10/1999 | Simmons | 709/218 |
| 5,978,381 A | | 11/1999 | Perlman et al. | 370/432 |
| 5,991,735 A | | 11/1999 | Gerace | 705/10 |
| 5,996,006 A | | 11/1999 | Speicher | 709/218 |
| 6,009,409 A | | 12/1999 | Adler et al. | 705/14 |
| 6,009,410 A | * | 12/1999 | LeMole et al. | 705/14 |
| 6,011,537 A | | 1/2000 | Slotznick | 345/115 |
| 6,029,195 A | | 2/2000 | Herz | 709/219 |
| 6,141,010 A | * | 10/2000 | Hoyle | 345/854 |
| 6,212,554 B1 | * | 4/2001 | Roskowski | 709/217 |
| 6,317,761 B1 | * | 11/2001 | Landsman et al. | 715/513 |
| 6,336,099 B1 | * | 1/2002 | Barnett et al. | 705/14 |
| 6,343,274 B1 | * | 1/2002 | McCollom et al. | 705/26 |
| 6,385,591 B1 | * | 5/2002 | Mankoff | 705/14 |
| 6,442,529 B1 | * | 8/2002 | Krishan et al. | 705/14 |
| 6,486,891 B1 | * | 11/2002 | Rice | 715/738 |
| 6,487,538 B1 | | 11/2002 | Gupta et al. | 705/14 |
| 6,615,248 B1 | | 9/2003 | Smith | 709/217 |
| 2002/0052925 A1 | * | 5/2002 | Kim et al. | 709/217 |
| 2002/0165767 A1 | * | 11/2002 | Ogura et al. | 705/14 |
| 2007/0239874 A1 | * | 10/2007 | Lazaridis et al. | 709/226 |

FOREIGN PATENT DOCUMENTS

WO     WO 01/43014 A1 *     6/2001

OTHER PUBLICATIONS

Greengard, Samuel, "Catch the wave as HR goes online," Personnel Journal, Jul. 1995.

* cited by examiner

*Primary Examiner* — James W Myhre
(74) *Attorney, Agent, or Firm* — Patterson & Sheridan, LLP

(57) ABSTRACT

A method for storing Internet advertisements at a user computer includes receiving plural Internet advertisements at the user computer. Some of the advertisements are tagged using a hypertext markup language (html) tag. An Internet browser within the computer determines which received advertisements are tagged and saves them within the computer. The saved advertisements are then displayed for a user to review later, e.g., in response to a button being toggled.

22 Claims, 1 Drawing Sheet

SYSTEM, METHOD, AND COMPUTER PROGRAM PRODUCT FOR STORING INTERNET ADVERTISEMENTS AT A USER COMPUTER

TECHNICAL FIELD

The present invention relates generally to Internet advertisements.

BACKGROUND OF THE INVENTION

In recent years, the Internet has been expanding at a furious pace. One reason for the rapid expansion of the Internet is the popularity of the free services that are available thereon. A company can fund free or reduced cost services on the Internet with revenue generated from advertisers. As a particular website increases in popularity and the viewer traffic increases, advertisers become more likely to increase their advertising budget in order to reach the growing audience.

Unfortunately, there exists a potential problem with the above-described business model that threatens to undermine the rapid expansion of the Internet. Specifically, this problem relates to the ineffectiveness of reaching target audiences on the Internet via the advertisements ("ads") displayed on web pages. If the perceived value of Internet advertising is reduced, it can trigger a reduction of advertising revenue which, in turn, could slow the rapid expansion of the Internet and reduce the availability of free services on the Internet.

One reason for the ineffectiveness of Internet advertising is the tendency for web sites to refresh advertisements displayed in advertising spaces with new advertisements. Since advertising revenue is often based on the number of ads displayed, the ads are refreshed quite frequently in order to display as many ads as possible. Typically, a user "responds" to an advertisement ("ad") by pointing to it with a mouse and then clicking on the ad. This action will link the user to a website represented by the ad. Unfortunately, the faster the ads are displayed, the less likely it is that web users will have an opportunity to respond to them. For example, if a user is in the middle of a search or reading a particular web page displayed, it can be highly disruptive to immediately stop the task at hand and click on an ad that piques his or her interest. However, when the user is finished with the particular task he or she may wish to click on an ad that was seen while working, but most likely that ad will not be displayed.

SUMMARY OF THE INVENTION

Having recognized the above drawbacks, the present invention provides the solutions noted below to one or more of them.

A method for storing Internet advertisements at a user computer includes receiving plural Internet advertisements at the user computer. Some of the advertisements include tags that, in a preferred embodiment, are Hypertext Markup Language (HTML) tags. The tagged advertisements are saved at the user computer. In a preferred embodiment, a button is displayed. When that button is toggled, saved advertisements are displayed. A user can scroll through the saved advertisements.

In a preferred embodiment, the saved advertisements include links to websites. When the saved advertisements are recalled, the user can access the websites by toggling on the links. Moreover, in a preferred embodiment, a previous button and a next button are displayed. The saved advertisements can be accessed when the previous button and next button are toggled.

In another aspect of the preferred embodiment of the present invention, a system for saving Internet advertisements at a user computer includes a server, a database, and a user computer. The database stores Internet advertisements and some of those advertisements include tags. The server transmits the Internet advertisements to the user computer. Moreover, the user computer includes a program for saving the Internet advertisements that include the tags.

In yet another aspect of the preferred embodiment of the present invention, a computer program device includes a computer readable means having logic means for receiving Internet advertisements. Some of the advertisements include tags. The computer readable means further includes logic means for saving the advertisements that include the tags.

In still another aspect of the preferred embodiment of the present invention, a method for viewing Internet advertisements at a user computer includes viewing a first banner advertisement and then, viewing a second banner advertisement. A request to view an advertisement history is initiated and in response thereto, the first and second banner advertisements are viewed again. The first and second banner advertisements are used to access respective web sites corresponding thereto.

The present invention will now be described, by way of example, with reference to the accompanying drawings, in which:

DESCRIPTION OF AN EMBODIMENT OF THE INVENTION

Figure 1:
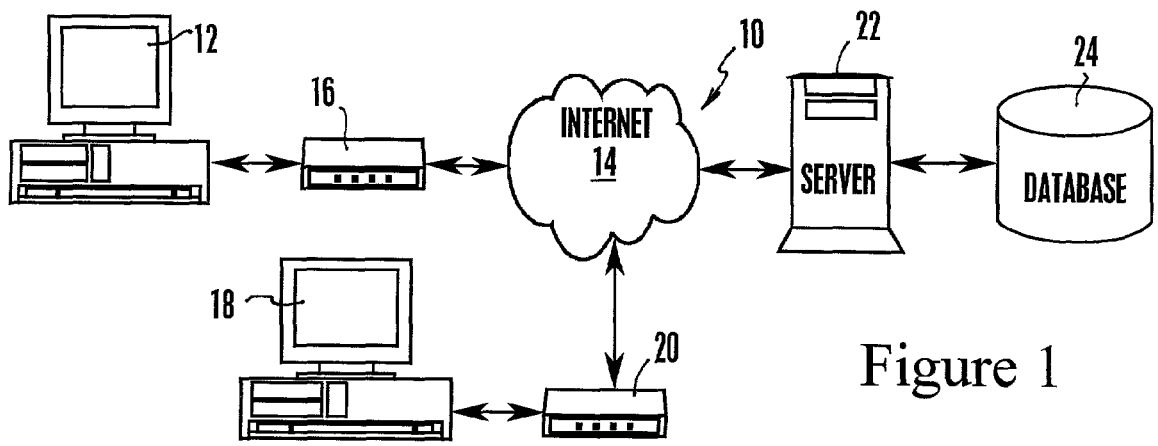
FIG. 1 is a block diagram of a system architecture.

Referring initially to FIG. 1, a system is shown and generally designated 10. As shown in FIG. 1, the system 10 includes a first user computer 12 connected to the Internet 14 via a first modem 16. FIG. 1 also shows a second user computer 18 connected to the Internet 14 via a second modem 20. It can be appreciated that the modems 16, 20 can be telephone modems, cable modems, DSL modems, etc. that provide connections to the Internet 14 by telephone line, television cable, LAN, WAN, T1, or any other means well known in the art.

As shown in FIG. 1, a server 22 is also connected to the Internet 14. The server 22, in turn, is connected to a database 24. The server 22 transmits user requested information stored in the database 24 to the user computers 12, 18 via the Internet 14. In many cases, along with the information, the server 22 transmits advertisements ("ads") to the user computers 12, 18. These ads help defray the cost of providing the information, services, etc. to the users. Thus, the users can receive much information available on the Internet 14 for no fee or for a nominal fee. It is to be appreciated that numerous servers can be connected to the Internet providing information and services to the user computers on a nearly infinite range of subjects.

While in a preferred embodiment, the user computers 12, 18 are personal computers manufactured by International Business Machines (IBM), the computers 12, 18 can be any computers, including Unix computers, or OS/2 servers, Windows NT servers, or laptop computer. (Unix is a registered trademark of The Open Group in the United States and other countries. OS/2 is a registered trademark of International Business Machines Corporation in the United States, other countries, or both. Windows NT is a trademark of Microsoft Corporation in the United States, other countries, or both.) Additionally, the computers 12, 18 can be hand held computers or any other devices that receive Internet content. Each user computer 12, 18 includes a series of computer-executable instructions, as described below, which will allow them to save certain ads received via the Internet so that a user may peruse the ads at his or her leisure after spending time online.

The instructions may be contained in random access memory (RAM) within each computer 12, 18 or on a data storage device with a computer readable medium, such as a computer diskette. Or, the instructions may be stored on a magnetic tape, conventional hard disk drive, electronic read-only memory (ROM), optical storage device, or other appropriate data storage device or transmitting device thereby making a computer program product, i.e., an article of manufacture according to the invention. In an illustrative embodiment of the invention, the computer-executable instructions may be written, e.g., using C++.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

Figure 2:
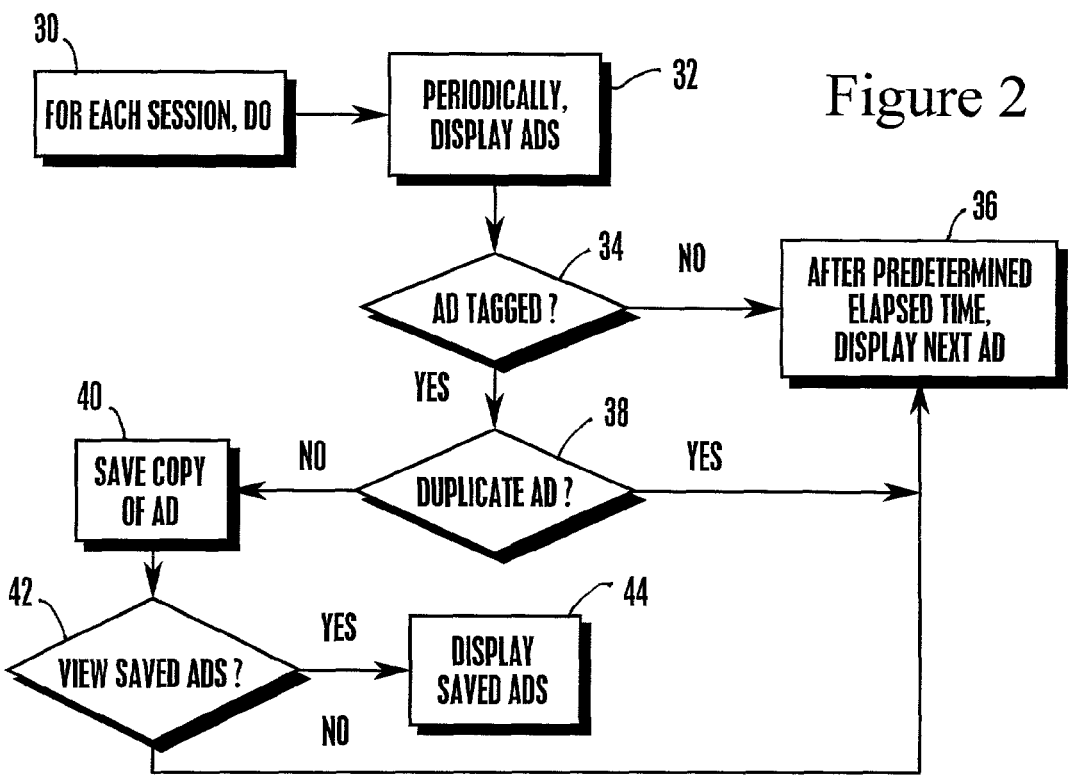
FIG. 2 is a flow chart of the operating logic of the preferred embodiment of the present invention.

Referring to FIG. 2, the operating logic of the present invention is shown and commences at block 30 with a do loop, wherein for each user Internet session, the succeeding steps are performed. At block 32, Internet ads are periodically displayed at the user computer 12. These ads are taken from the database 22 by the server 20 and transmitted to the user computer 12 via the Internet 14. Moving to decision diamond 34, each time an ad is displayed, it is determined whether the ad is tagged indicating that the ad is to be used for the display of an Internet "banner" advertisement. In a preferred embodiment, an HTML tag, e.g., "a href=," is used to identify these ads.

If, at decision diamond 34, the ad is not tagged, the logic moves to block 36 wherein after a predetermined period of time, a new ad is displayed. On the other hand, if the ad is tagged, the logic continues to decision diamond 38 where it is determined whether the tagged ad is a duplicate of a tagged ad previously saved at the computer 12. If so, the logic moves to block 36 wherein after predetermined period of time, a new ad is again displayed. If not, the logic proceeds to block 40 where a copy of the tagged ad is saved to the user computer 12.

Thereafter, the logic continues to decision diamond 42 where it is determined whether the user wishes to view the saved ads. If not, the logic returns to block 36 and a new ad is displayed after a predetermined period of time elapses. If the user wishes to view the saved ads, the logic moves to block 44 and the saved ads are displayed for the user's perusal.

It can be appreciated that the tagged ads may be captured and saved many ways. In one exemplary, non-limiting embodiment, the Internet browser includes an "ad history" file. A record within this file records the link information and image file name for the tagged ad. In conjunction with this file, a directory or folder for image files is created where the ad image files are stored. The ad images files can be saved in a browser "cache" memory for fast retrieval at a later time. In this embodiment, the user can specify preferences for the ad history file such as an upper limit for the number of ads saved. When this upper limit is met, the oldest saved ad can be displaced by the newly saved ad. Thus, memory is conserved while still providing the user with a number of saved ads deemed to be sufficient by the user for most circumstances likely to be encountered while working online.

Figure 3:
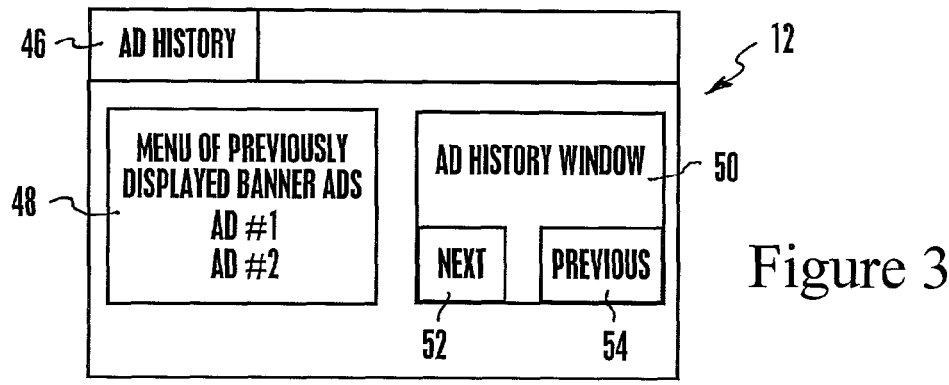
FIG. 3 is a view of a computer screen.

It can also be appreciated that the ads may be displayed in many ways. In one exemplary, non-limiting embodiment, shown in FIG. 3, an "Ad History" button 46 is displayed on the Internet browser tool bar. Upon clicking the "Ad History" button 46, the user is presented with a menu 48 of previously displayed banner ads. The ads can be displayed in order from most recent to the oldest. The ads in the menu 48 can also continue to retain any hot link attributes that were present with the original display of the ads.

In another exemplary, non-limiting embodiment, captured ads can be presented to the user one at a time within an "Ad History" window 50. This window 50 can include a "Previous" button 52 and a "Next" button 54 with which the user can navigate through previously displayed ads beginning with the most recent until he or she finds an ad or ads that may have caught his or her eye while working. The "Ad History" window 50 can also include a means for filtering previously displayed ads, so that only ads corresponding to one or more user selected attributes are eligible for display.

With the above logic in mind, it can be appreciated that when a user completes a task online, such as reading or searching for information, he or she can easily return to any interesting ads that were displayed while he or she was working. Thus, ads which previously may have gone unnoticed or unresponded to by a user may invoke a response—after the user is finished with a particular task.

With the configuration of structure described above, it is to be appreciated that system and method described above provides a means whereby Internet advertisements can be stored for later viewing by an Internet user. A user who may disregard a particular ad while working may find that ad to be appealing when viewed at his or her leisure. Thus, the effectiveness of Internet advertising is increased.

While the particular SYSTEM, METHOD, AND COMPUTER PROGRAM PRODUCT FOR STORING INTERNET ADVERTISEMENTS AT A USER COMPUTER as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A computer-implemented method, comprising:
   receiving, at a computer of a user: (i) a first web page comprising a first banner advertisement associated with a link identifying a first target website and (ii) a second webpage comprising a second banner advertisement associated with a link identifying a second target website, without the user requesting the banner advertisements;
   identifying and saving the banner advertisements and associated links by operation of one or more computer processors, without having received any user request to save the banner advertisements and without having received any user request to save the associated links;
   providing an advertising history window for user-controlled browsing of the banner advertisements saved from the web pages;
   receiving, via the advertising history window, user input selecting one of the banner advertisements saved from the web pages; and
   accessing, via the link associated with the selected banner advertisement, the target website identified by the link associated with the selected banner advertisement.

2. The method of claim 1, wherein the selected banner advertisement includes a tag that is a Hypertext Markup Language (HTML) tag.

3. The method of claim 1, wherein providing an advertising history window for browsing of the banner advertisements saved from the web pages, based on user input comprises:
   outputting a button for display; and
   in response to the button being toggled, outputting the one of the saved advertisements for display.

4. The method of claim 1, wherein providing an advertising history window for browsing of the banner advertisements saved from the web pages, based on user input comprises:
   outputting a previous button for display in the advertising history window;
   outputting a next button for display in the advertising history window; and
   accessing saved advertisements when the previous button and next button are toggled.

5. The computer-implemented method of claim 1, wherein the banner advertisements are saved without exceeding a user-defined threshold amount of storage for saving banner advertisements.

6. The computer-implemented method of claim 5, whereby at least one of the banner advertisements displaces at least one previously-saved banner advertisement so as not to exceed the user-defined threshold amount of storage for saving banner advertisements.

7. The computer-implemented method of claim 6, wherein the at least one previously saved banner advertisement is selected based on a timestamp associated with the at least one previously saved banner advertisement being older than all other previously saved banner advertisements.

8. The computer-implemented method of claim 1, wherein each banner advertisement is associated with at least one attribute, and wherein the method further comprises:
   receiving, via the advertising history window, user selection of one or more attributes;
   wherein at least one the advertising history window is provided for user-controlled browsing of only those of the banner advertisements that match the one or more attributes.

9. The computer-implemented method of claim 1, further comprising:
   receiving a third web page comprising a third banner advertisement associated with a link identifying a third target website; and
   wherein the third banner advertisement is not saved, upon determining that the third banner advertisement matches a previously-saved banner advertisement.

10. The computer-implemented method of claim 1, wherein the second web page further comprises a banner rotation, whereby the second banner advertisement is output in the second web page at a first point in time and a third banner advertisement is output in the second web page at a subsequent point in time, instead of the second banner advertisement.

11. The computer-implemented method of claim 10, whereby the advertising history window allows user-controlled browsing of banner advertisements from different web pages and from different points in time.

12. The computer-implemented method of claim 1, wherein associations between the banner advertisements and the links are stored in an advertising history file at the computer of the user.

13. The computer-implemented method of claim 1, further comprising:
   outputting a menu of saved banner advertisements, for display in the advertising history window.

14. The computer-implemented method of claim 13, wherein the menu of saved banner advertisements is ordered based on timestamps associated with the saved banner advertisements.

15. The computer-implemented method of claim 1, wherein each of the saved banner advertisements was previously displayed as part of the received web pages.

16. The computer-implemented method of claim 1, whereby the advertising history window allows user-controlled browsing of banner advertisements without requiring any of the web pages to be revisited.

17. A system, comprising:
   at least one user computer, wherein the at least one user computer is connected to a web server via a network connection, wherein the user computer receives: (i) a first web page comprising a first banner advertisement associated with a link identifying a first target website and (ii) a second web page comprising a second banner advertisement associated with a link identifying a second target website, while the user is engaged in activity other than requesting the banner advertisements, wherein the user computer receives at least one of the banner advertisements from the web server, the user computer including a program which, when executed, performs an operation comprising:
      identifying and saving the banner advertisements and associated links, without having received any user request to save the banner advertisements and without having received any user request to save the associated links;
      outputting the saved banner advertisements for display in an advertising history window such that a user may browse and select one or more of the saved banner advertisements from the advertising history window;
      selecting, based on user input, one or more of the saved banner advertisements for display thereof;

accessing, via the link associated with the selected banner advertisement, the target website identified by the link associated with the selected banner advertisement;

outputting a previous button for display;

outputting a next button for display; and accessing the saved banner advertisements when the previous button and next button are toggled.

18. A non-transitory computer readable medium containing a program which, when executed, performs an operation comprising:

receiving, at a user computer: (i) a first web page comprising a first banner advertisement associated with a link identifying a first target website and (ii) a second web page comprising a second banner advertisement associated with a link identifying a second target website, the banner advertisements being sent to the user computer automatically in response to a user request for information other than the banner advertisements;

identifying the received banner advertisements in the web pages;

saving the identified banner advertisements and associated links, without having received any user request to save the banner advertisements and without having received any user request to save the associated links;

providing an advertising history window for user-controlled browsing of the banner advertisements saved from the plurality of web pages;

receiving, via the advertising history window, user input selecting one of the banner advertisements saved from the web pages; and accessing, via the link associated with the selected banner advertisement, the target website identified by the link associated with the selected banner advertisement.

19. The non-transitory computer readable medium of claim 18, wherein the selected banner advertisement includes a Hypertext Markup Language (HTML) tag.

20. The non-transitory computer readable medium of claim 18, wherein the operation further comprises:

outputting a button for display; and outputting at least one of the saved advertisements for display, in response to the button being toggled.

21. The non-transitory computer readable medium of claim 18, wherein at least one of the saved banner advertisements is associated with a tag;

and wherein saving the at least one banner advertisement at the user computer at least is done at least partially based on the tag.

22. The non-transitory computer readable medium of claim 18, wherein providing an advertising history window for browsing of the banner advertisements saved from the web pages, based on user input comprises:

outputting a previous button for display;

outputting a next button for display; and accessing the saved banner advertisements when the previous button and next button are toggled.

* * * * *